F. A. RYTHER.
INDICATOR FOR BALING PRESSES.
APPLICATION FILED MAR. 3, 1911.

993,413.

Patented May 30, 1911.

2 SHEETS—SHEET 1.

Witnesses:
C. C. Palmer
F. W. Hoffmeister

Inventor:
Frank A. Ryther
By E. W. Burgess
Attorney.

F. A. RYTHER.
INDICATOR FOR BALING PRESSES.
APPLICATION FILED MAR. 3, 1911.
993,413.
Patented May 30, 1911.
2 SHEETS—SHEET 2.
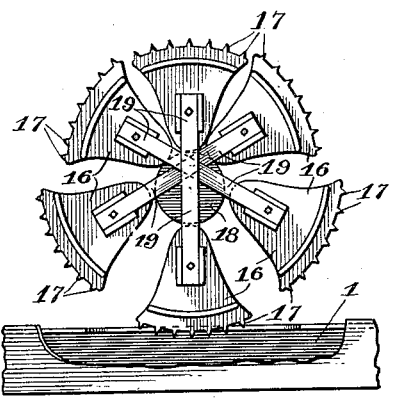
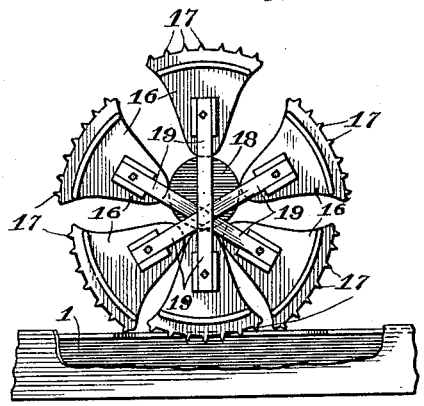
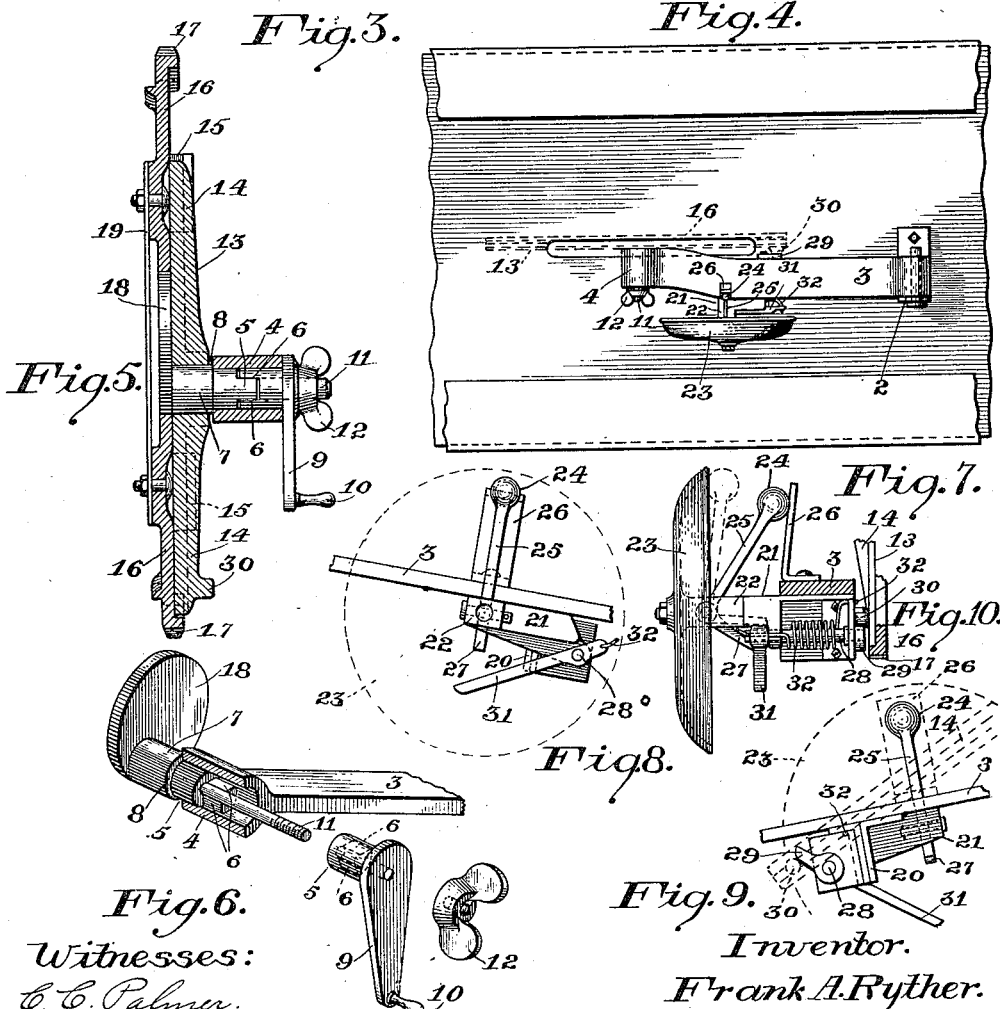
Witnesses:
C. C. Palmer.
F. W. Hoffmeister.
Inventor.
Frank A. Ryther.
By E. W. Burgess
Attorney.

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

INDICATOR FOR BALING-PRESSES.

993,413.  Specification of Letters Patent.  Patented May 30, 1911.

Application filed March 3, 1911. Serial No. 611,999.

*To all whom it may concern:*

Be it known that I, FRANK A. RYTHER, a citizen of the United States, residing at Chicago, in the county of Cook and State of Illinois, have invented certain new and useful Improvements in Indicators for Baling-Presses, of which the following is a specification.

My invention relates to baling presses, and in particular to mechanism for indicating when a predetermined length of bale has been compressed into the bale chamber, and consists in improved means for adjusting the indicator mechanism in a manner whereby the bales may be longer or shorter within predetermined limits, the object of my invention being to provide a structure having few parts, one that may be readily and positively adjusted as desired, not subject to disarrangement, and efficient in operation. I attain these objects by means of the mechanism illustrated by the accompanying drawings, in which—

Figure 1:
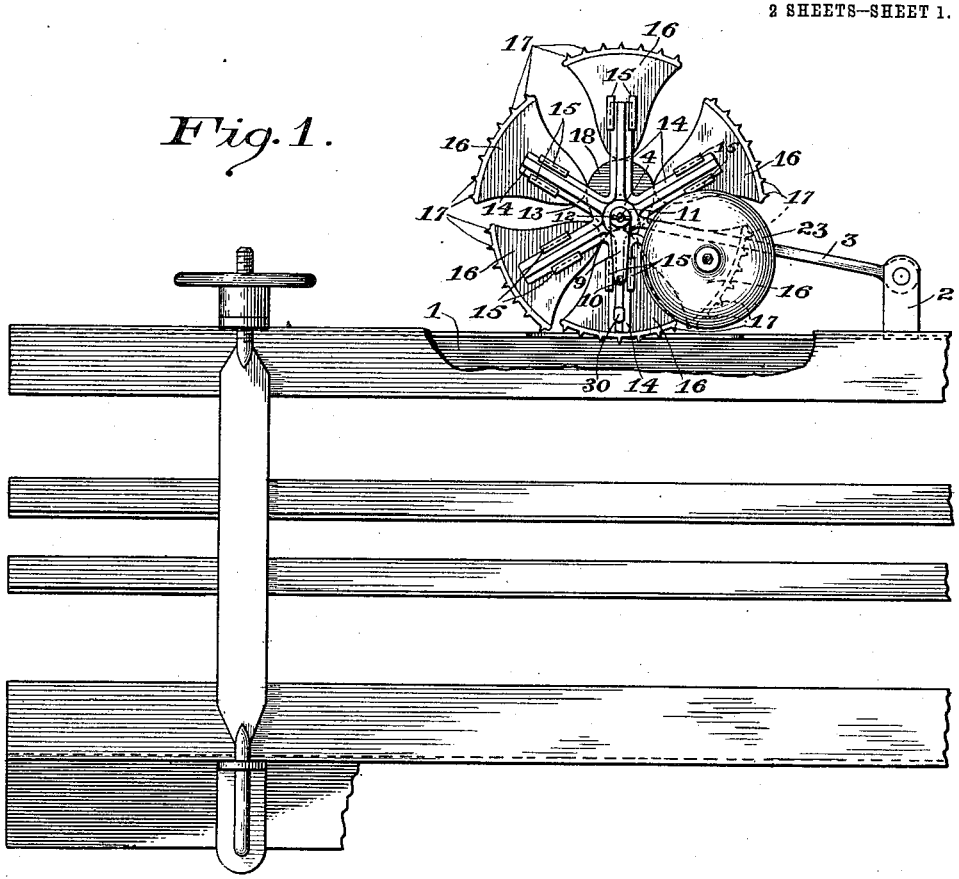
Figure 2:
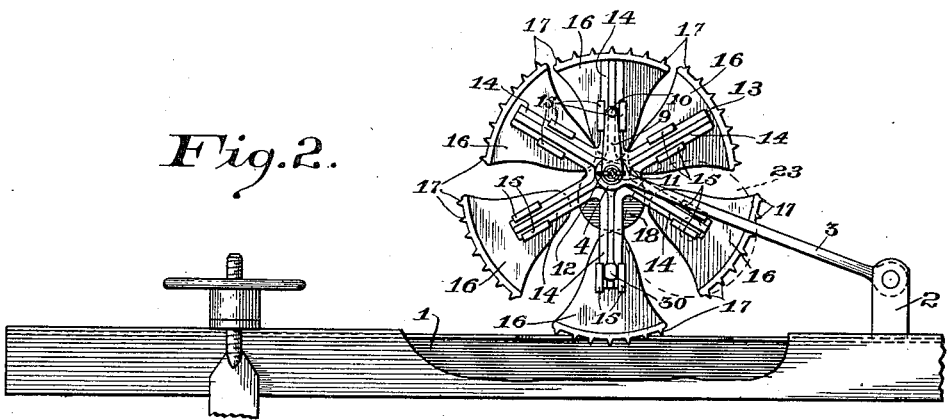

Figure 1 is a side elevation of the rear end of the bale chamber of a baling press having my improved indicator mounted thereon; Fig. 2 is a part of Fig. 1 in a different position of adjustment, having the lower part of the chamber cut away; Fig. 3 is a side elevation of the indicator, representing it as adjusted for a maximum length of bale; Fig. 4 is a side elevation like Fig. 3 and representing the mechanism as adjusted for a minimum length of bale; Fig. 5 is a sectional elevation of the indicator wheel; Fig. 6 is a detail in perspective of part of the mechanism as shown in Fig. 5; Fig. 7 is a top plan view of the indicator supporting mechanism as attached to the upper part of the bale chamber; Fig. 8 is a detail of part of the alarm and its tripping mechanism; Fig. 9 is a detail showing the manner of tripping the alarm mechanism; and Fig. 10 is a cross section of Fig. 7 on an enlarged scale, showing the operation of the alarm mechanism.

The same reference characters designate like parts throughout the several views.

1 represents the bale chamber of a hay press; 2 a bracket secured to the upper side thereof; 3 an arm pivotally connected with the bracket and extending toward the rear end of the chamber and provided at its rear end with a transversely arranged sleeve portion 4, in which is journaled an arbor 5 that is formed in two sections, having their inner adjacent ends provided with complemental clutch faces 6 that are adapted to engage with each other in a manner to cause the two parts of the arbor to rotate as one piece, one end of the arbor having an enlarged portion 7 that projects beyond the sleeve and having a shoulder 8 that contacts with the end thereof, the opposite end of the arbor being provided with an arm 9 and a handle 10 whereby it may be rotated, and the two sections are secured together by means of an axle bolt 11 and a winged nut 12. Journaled upon the enlarged portion of the arbor is a spider 13, having a series of radially arranged arms 14 that are oppositely disposed in pairs, the members of which are arranged in diametrical relation and adapted to slidably receive socket members 15 integral with radially movable sector plates 16 that are provided with teeth 17 upon their rims and having their inner ends contacting with a disk 18 integral with the arbor 5 at its enlarged end and arranged eccentric with the axis thereof, the disk being a journal upon which the plates rotate. Each pair of the oppositely disposed sectors is connected together by means of bars 19, each pair sliding as a single unit upon the oppositely disposed arms and controlled by the eccentrically arranged disk 18, the position of which may be adjusted angularly by turning the arbor by means of the arm 9 and securing the arbor against turning by means of the clamping nut 12. The toothed rims of the sectors project through a slotted opening in the upper wall of the bale chamber and ride upon the bale as it is being formed and rotate the spider wheel to which the sectors are connected. When the arbor is adjusted in a manner to throw the disk 18 downward, as shown in Fig. 3, the radial distance between the axis of the spider wheel and the rim of the sector is at its greatest length and the effective diameter of the indicator mechanism is increased proportionately. With the arbor and disk adjusted as shown in Fig. 4 the effective diameter of the indicator wheel is at its minimum and the diameter of the wheel indicates the required length of bale.

20 represents a bracket secured to arm 3; 21 a block secured to the bracket and having a laterally projecting stem 22, upon which is mounted an alarm bell 23; 24 represents a bell clapper pivotally mounted upon the stem and having an upwardly projecting weighted arm 25 that normally rests against a bracket 26 secured to arm 3, and an inwardly projecting finger 27 at its lower end.

28 represents a rocking trip shaft journaled in block 21, having an arm 29 secured to its inner end that is adapted to engage with a contact block 30 integral with one of the arms of the spider wheel, as shown in Figs. 9 and 10. Secured to the opposite end of the shaft is an arm 31, and 32 represents a spring coiled about the shaft and having its inner end connected with a fixed part of the support and its opposite end with arm 31, the spring being operative to rock the shaft quickly in a direction to cause arm 31 to strike the finger of the bell clapper and throw the weighted end thereof against the bell, the spring being energized by the action of the contact block against arm 29 in a manner to rock the shaft against the force of the spring. At each revolution of the spider carrying the sliding sectors the bell is caused to ring, the revolution of the spider being controlled by the movement of the bale through the chamber, and the length of the bale determined by the effective diameter of the indicator wheel.

What I claim as my invention, and desire to secure by Letters Patent, is:

1. An indicator for baling press including, in combination, an indicator wheel having a series of oppositely arranged and radially movable sectors, said sectors being provided with teeth upon their rims and connected together in pairs disposed in diametrical relation, an arbor, a rotatable support for said sectors journaled upon said arbor, a disk secured to said arbor and arranged eccentrically relative to the axis thereof, said disk engaging with said sectors in a manner whereby they are permitted to rotate in contact with the periphery thereof when said support is rotated, and means whereby said arbor may be turned about its axis in a manner to vary the position of said disk.

2. An indicator for baling press including, in combination, an indicator wheel including a wheel member rotatable about a relatively fixed axis, a series of oppositely disposed and radially movable sectors connected together in pairs, arranged in diametrical relation and supported by said wheel member, said sectors rotatable about an axis arranged eccentrically with the axis of said wheel member.

3. An indicator for baling press including, in combination, an indicator wheel including a wheel member rotatable about a relatively fixed axis, a series of oppositely disposed and radially movable sectors connected together in pairs, arranged in diametrical relation and supported by said wheel member, said sectors rotatable about an axis arranged eccentrically to the axis of said wheel member, and means for varying the angular relation of one axis relative to the other.

4. An indicator for baling press including, in combination, an arbor, an indicator wheel mounted upon said arbor, said wheel including a spider having a series of radial arms oppositely disposed and arranged in pairs in diametrical relation, a series of sectors slidably mounted upon said arms and connected together in pairs, the members of each pair being oppositely disposed relative to the axis of said spider, a disk carried by said arbor and having its axis eccentric to the axis thereof, said sectors journaled upon said disk, and means for rotating said arbor in a manner to change the angular relation of the disk relative to the axis of said arbor.

5. An indicator for baling press including, in combination, a bale chamber, an indicator wheel having a series of oppositely disposed and radially movable sectors, said sectors being provided with teeth upon their rims and connected together in pairs arranged in diametrical relation, an arm having one end pivotally connected with said bale chamber, an arbor journaled at the opposite end of said arm, a spider forming part of said indicator wheel and journaled upon said arbor and having a series of oppositely disposed radial arms having said sectors slidably mounted thereon, a disk secured to said arbor and having its axis eccentric thereto, said disk forming a journal for the inner ends of said sectors, and means for turning said arbor in a manner to vary the angular relation of the disk to the axis of said arbor.

6. An indicator for baling press including, in combination, a bale chamber, an arm pivotally mounted upon said bale chamber, a two-part arbor journaled upon said arm and having an enlarged portion upon one part extending beyond said arm, and means for clamping the two members of the arbor against said arm, an indicator wheel mounted upon the enlarged portion of said arbor, said wheel including a spider having a series of oppositely disposed radial arms arranged in pairs in diametrical relation, a series of sectors slidably mounted upon said arms and connected together in pairs, the members of each pair being oppositely disposed relative to the axis of said spider, a disk integral with the enlarged portion of said arbor and having its axis eccentric to the axis thereof, said sectors being journaled upon said disk whereby, when said arbor is turned in its bearings, the effective diameter of said indicator wheel is varied.

7. An indicator for baling press including, in combination, a bale chamber, an indicator wheel having a series of oppositely disposed and radially movable sectors, said sectors being provided with teeth upon their rims and connected together in pairs arranged in diametrical relation, an arm arranged longitudinally and having one end pivotally connected with said bale chamber and having a transversely arranged sleeve at its opposite end, a two-part arbor journaled in said sleeve and having its adjacent ends provided with interlocking clutch teeth, one of said parts having an enlarged portion projecting beyond said sleeve, the other part provided with a laterally projecting arm whereby the arbor may be turned in its bearings, means for clamping the said two parts of the arbor against said sleeve, a disk secured to the end of the enlarged portion of said arbor and having its axis eccentric thereto, said indicator wheel journaled upon the enlarged portion of said arbor, and the inner ends of said sectors journaled upon said disk whereby, when said arbor is turned in its bearings, the effective diameter of said indicator wheel is varied.

8. An indicator for baling press including, in combination, a bale chamber, an indicator wheel having a series of oppositely disposed and radially movable sectors, said sectors being provided with teeth upon their rims and connected together in pairs arranged in diametrical relation, an arm having one end pivotally connected with said bale chamber, an alarm bell mechanism mounted upon said arm, an arbor journaled at the opposite end of said arm, a spider forming part of said indicator wheel, journaled upon said arbor and having a series of oppositely disposed radial arms having said sectors slidably mounted thereon, a contact block carried by said spider and adapted to trip said alarm bell, a disk secured to said arbor and having its axis eccentric thereto, said disk forming a journal for the inner ends of said sectors, and means for turning said arbor in a manner to vary the angular relation of the disk to the axis of said arbor.

FRANK A. RYTHER.

Witnesses:
  WILLIAM CLARK,
  ALBERT H. HOLMES.

---

Copies of this patent may be obtained for five cents each, by addressing the "Commissioner of Patents, Washington, D. C."